United States Patent
Ozawa et al.

(10) Patent No.: US 9,599,768 B2
(45) Date of Patent: Mar. 21, 2017

(54) SURFACE LIGHT SOURCE DEVICE HAVING FRAME WITH LIGHT ABSORBING AND REFLECTING PORTIONS

(71) Applicant: OMRON Corporation, Kyoto-shi, Kyoto (JP)

(72) Inventors: Kenji Ozawa, Saitama (JP); Kensuke Nambu, Saitama (JP); Yuichi Hiraki, Saitama (JP)

(73) Assignee: OMRON Corporation, Kyoto (JP)

(*) Notice: Subject to any disclaimer, the term of this patent is extended or adjusted under 35 U.S.C. 154(b) by 263 days.

(21) Appl. No.: 14/463,357

(22) Filed: Aug. 19, 2014

(65) Prior Publication Data

US 2014/0354918 A1 Dec. 4, 2014

Related U.S. Application Data

(63) Continuation of application No. 13/217,567, filed on Aug. 25, 2011, now Pat. No. 8,870,438.

(30) Foreign Application Priority Data

Sep. 3, 2010 (JP) .................................. 2010-198398

(51) Int. Cl.
*G02B 6/44* (2006.01)
*F21V 8/00* (2006.01)
*G02F 1/1333* (2006.01)

(52) U.S. Cl.
CPC .......... *G02B 6/0088* (2013.01); *G02B 6/0031* (2013.01); *G02F 1/133308* (2013.01);
(Continued)

(58) Field of Classification Search
CPC ......... G02F 1/133608; G02F 1/133615; G02B 6/0013; G02B 6/0023
See application file for complete search history.

(56) References Cited

U.S. PATENT DOCUMENTS 6,753,843 B2 * 6/2004 Wang ................ G02F 1/133308
345/102
6,814,458 B2 * 11/2004 Kim ..................... G02B 6/0031
349/62

(Continued)

FOREIGN PATENT DOCUMENTS

JP 3130253 U 3/2007
JP 2010117642 A 5/2010

OTHER PUBLICATIONS

Office Action issued in corresponding Japanese Application No. 2014-080391, mailed Dec. 3, 2014 (11 pages).

*Primary Examiner* — Ismael Negron
(74) *Attorney, Agent, or Firm* — Osha Liang LLP

(57) ABSTRACT

A surface light source includes a light source facing an end face of a lightguide plate, a rectangular-shaped frame surrounding an outer peripheral surface of the lightguide plate, and a reflecting sheet disposed in on a lower surface of the frame. The frame includes an inside frame portion made of a white resin, and an outside frame portion made of a black resin, with the interface between the inside and outside frame portions being inclined with respect to the inside surface of the inside frame portion. The inside frame portion and the outside frame portion are integrally molded by a two-color molding method.

19 Claims, 19 Drawing Sheets

(52) U.S. Cl.
CPC .......... *G02B 6/0065* (2013.01); *G02B 6/0068* (2013.01); *G02B 6/0083* (2013.01)

(56) References Cited

U.S. PATENT DOCUMENTS

| | | | | |
|---|---|---|---|---|
| 6,867,827 B2* | 3/2005 | Cha | ................. | G02B 6/0071 |
| | | | | 349/58 |
| 6,942,353 B2* | 9/2005 | Yamada | ............... | G02B 6/0086 |
| | | | | 362/225 |
| 7,014,350 B2* | 3/2006 | Nomura | ........... | G02F 1/133615 |
| | | | | 362/609 |
| 7,440,046 B2* | 10/2008 | Kang | ................. | G02B 6/0031 |
| | | | | 349/56 |
| 7,724,317 B2* | 5/2010 | Kim | ................. | G02F 1/133308 |
| | | | | 349/58 |
| 8,031,290 B2* | 10/2011 | Fu | ................. | G02B 6/0091 |
| | | | | 349/58 |
| 8,154,680 B2* | 4/2012 | Doyle | ................. | G02B 6/0055 |
| | | | | 349/137 |
| 8,992,064 B2* | 3/2015 | Horikawa | ........... | G02B 6/0091 |
| | | | | 349/58 |
| 2004/0212755 A1* | 10/2004 | Fukayama | ........ | G02F 1/133308 |
| | | | | 349/58 |
| 2005/0068470 A1* | 3/2005 | Won | ................. | G02B 6/0031 |
| | | | | 349/58 |
| 2012/0063167 A1* | 3/2012 | Ozawa | ................. | G02B 6/0031 |
| | | | | 362/609 |

* cited by examiner

Prior Art

Prior Art

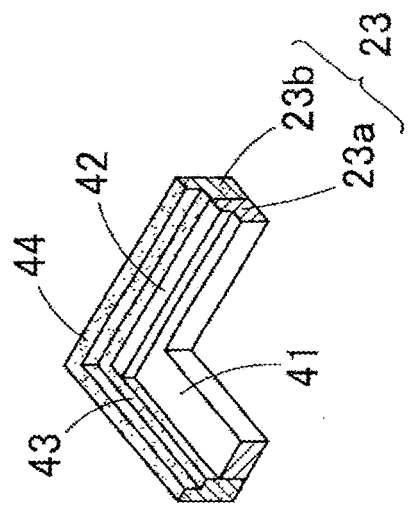
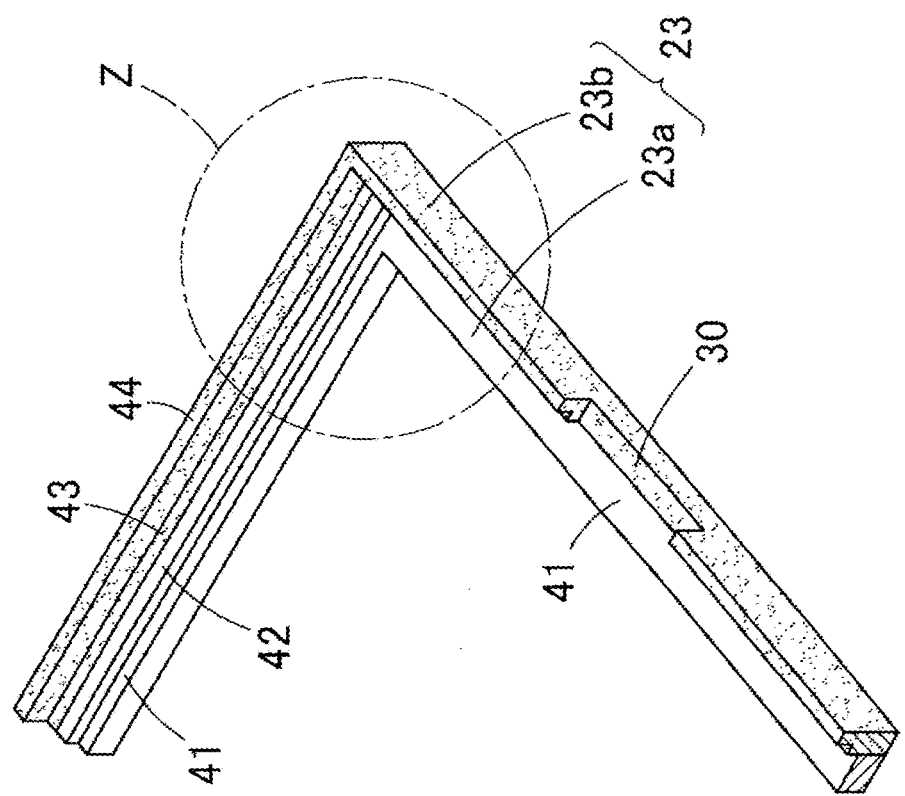

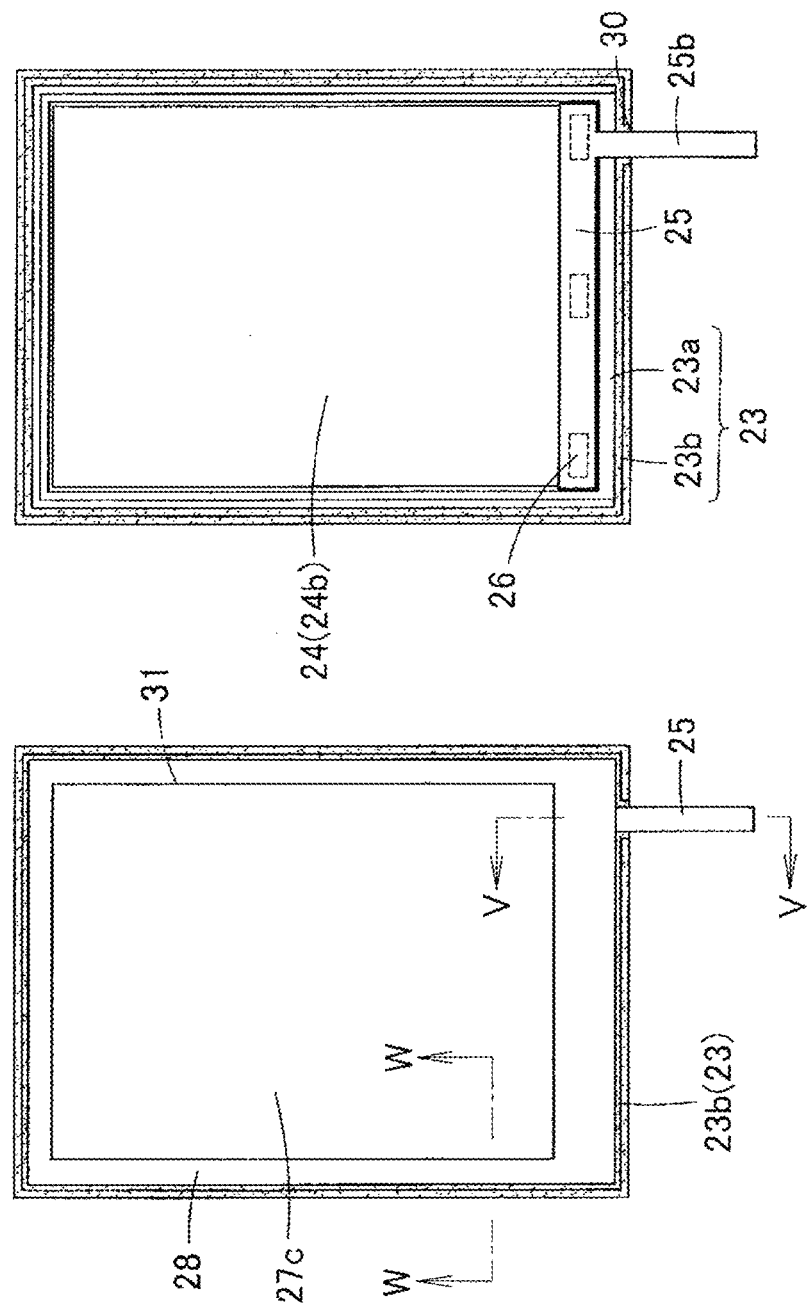

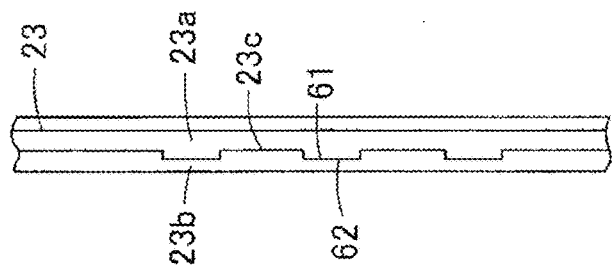
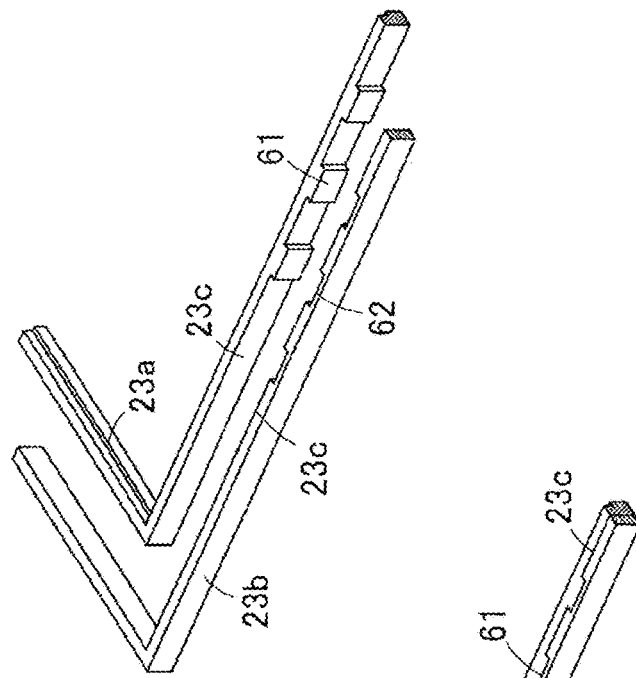
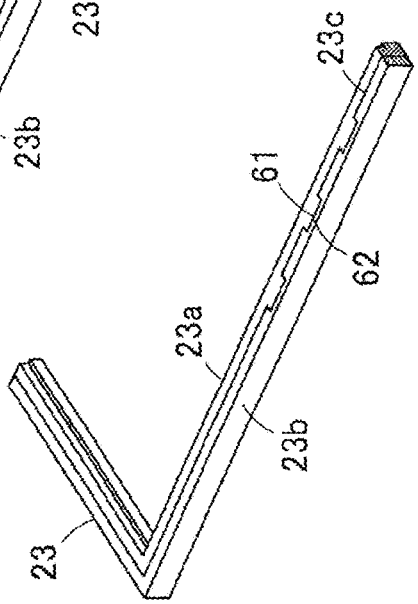

SURFACE LIGHT SOURCE DEVICE HAVING FRAME WITH LIGHT ABSORBING AND REFLECTING PORTIONS

CROSS-REFERENCE TO RELATED APPLICATIONS

The present application is a Continuation of and claims benefit, pursuant to 35 U.S.C. §120, of U.S. patent application Ser. No. 13/217,567 filed on Aug. 25, 2011, currently pending, which claims priority from Japanese Patent Application No. JP 2010-198398 filed on Sep. 3, 2010, the contents of which are incorporated herein by reference.

BACKGROUND OF THE INVENTION

1. Technical Field

The present invention relates to a surface light source device and a frame used therein. For example, the invention relates to a surface light source device that is used as a backlight illuminating a liquid crystal panel, and to a frame that surrounds a lightguide plate in the surface light source device.

2. Related Art

[First Conventional Example]

A liquid crystal display unit of a mobile phone is configured such that a surface light source device (backlight) for illumination is disposed behind a liquid crystal panel. FIG. 1 is an exploded perspective view illustrating a general structure of a surface light source device used in the liquid crystal display unit. FIG. 2A is a plan view of the assembled surface light source device, and FIG. 2B is an enlarged sectional view taken on a line X-X of FIG. 2A.

As illustrated in FIGS. 1, 2A, and 2B, in a surface light source device 11, a reflecting sheet 12 is bonded to a lower surface of a rectangular frame 13 made of a white resin, thereby covering the lower surface of the frame 13. Plural diffusion sheets and optical sheets 17 are accommodated in the frame 13 while being laminated on a surface (upper surface) on a light output side of a lightguide plate 14. Plural light sources 16 mounted on a lower surface of a flexible printed board 15 are also accommodated in the frame 13, and each light source 16 is disposed opposite an end face of the lightguide plate 14. A frame-shaped light shielding sheet 18 made of a black resin is bonded to the upper surface of the frame 13, whereby the edge of the lightguide plate 14 is covered with the light shielding sheet 18 while the lightguide plate 14 is retained between the light shielding sheet 18 and the reflecting sheet 12. For example, Japanese Unexamined Patent Publication No. 11-52140 discloses a surface light source device in which the frame made of the white resin is used. Japanese Unexamined Patent Publication No. 11-52140 also discloses a surface light source device in which an upper surface portion of the frame is molded using the black resin while a side surface portion of the frame is molded using the white resin.

Not only the frame 13 has a function of a case in which the lightguide plate 14 and the optical sheet 17 are accommodated, but also the frame 13 has a function of improving use efficiency of the light. As illustrated by a solid-line arrow in FIGS. 2A and 2B, when the light guided in the lightguide plate 14 leaks from a side surface of the lightguide plate 14, the leaked light is reflected by an inner surface of the frame 13 (sometimes titanium oxide is added to the white resin to enhance reflectance), and the light is incident again from the side surface of the lightguide plate 14. Therefore, the light that leaks from the lightguide plate 14 once can be utilized to improve the use efficiency of the light.

However, when the frame 13 made of the white resin is used, the light that leaks from the lightguide plate 14 is not completely reflected by the frame 13, but part of the light that leaks from the lightguide plate 14 is transmitted through the frame 13 to leak out as illustrated by a broken-line arrow in FIGS. 2A and 2B. Recently a display screen is increased in size while the liquid crystal display unit is thinned. For example, in a large-screen liquid crystal display apparatus provided with a touch panel, a width of the display screen is substantially equal to a width of the mobile phone. An area of an effective emission region is enlarged while external dimensions of the surface light source device is restricted. As a result, it is inevitable to narrow the frame of the surface light source device, and a thickness of the frame is thinned more and more. Consequently, an amount of light that is transmitted through the frame 13 to leak out is gradually increased.

When the light that is transmitted through the frame 13 to leak from the surface light source device 11 is increased, an outer peripheral surface of the surface light source device 11 is brightened to degrade visual quality of the liquid crystal display unit. When a photosensor or a light receiving portion for infrared communication is disposed near the surface light source device 11 incorporated in the mobile phone, the light that leaks from the outer peripheral surface of the surface light source device 11 possibly causes a malfunction of the photosensor or the light receiving portion.

[Second Conventional Example]

As described above, Japanese Unexamined Patent Publication No. 11-52140 discloses a surface light source device in which the frame is molded by the black resin. In the surface light source device in which the frame is molded by the black resin, because the light that leaks from the side surface of the lightguide plate is absorbed by the side surface portion of the frame made of the black resin, the light hardly leaks out from the side surface of the surface light source device.

However, in the surface light source device in which the frame is molded by the black resin, the use efficiency of the light of the surface light source device is degraded because the light that leaks from the side surface of the lightguide plate cannot be reflected by the side surface portion of the frame and incident to the lightguide plate again. As a result, the amount of light output from the effective emission region of the surface light source device is decreased to degrade emission luminance.

As a result of an experiment and a simulation, which are performed to demonstrate the degradation of the emission luminance, the following results were obtained. In the surface light source device in which the frame having four sides made of the white resin was used, it was assumed that the average luminance was set to 100% when the luminance was measured at 25 points (the number of measuring points) in the emission surface. In the surface light source device that has the same structure except that the frame having four sides made of the black resin was used, the average luminance of 92 to 93% was obtained when the luminance was measured at 25 points. In the surface light source device in which the frame having four sides made of the white resin was used, it was assumed that the average luminance was set to 100% when the luminance was measured at 289 points in the emission surface. In the surface light source device that has the same structure except that the frame having four sides made of the black resin was used, the average luminance of 90 to 92% was obtained when the luminance was measured at 289 points. In the surface light source device in which the frame having four sides made of the white resin was used, it was assumed that the average luminance was set to 100% when the luminance was simulated at 25 points in the emission surface. In the surface light source device that has the same structure except that the frame having four sides made of the black resin was used, the average luminance of 90% was obtained when the luminance was simulated at 25 points. Therefore, when the black-resin frame is used, it is found that the black-resin frame absorbs about 10% of the mount of light output from the emission surface in the surface light source device in which the white-resin frame was used.

SUMMARY OF INVENTION

Therefore, one or more embodiments of the present invention provides a surface light source device, in which the light that leaks from the side surface of the lightguide plate can be reflected by the frame and incident to the lightguide plate again, the light to be transmitted through the frame can be absorbed and reduced by the frame, and a balance can be established between improvement of the use efficiency of the light and improvement of performance that prevents the leakage of the light. Further, one or more embodiments of the invention provides a frame used in the surface light source device.

According to one or more embodiments of the invention, there is provided a surface light source device in which a light source and a lightguide plate are accommodated in a frame such that an outer peripheral surface of the lightguide plate is surrounded by the frame, light output from the light source being incident to the lightguide plate from an end face of the lightguide plate, the light guided in the lightguide plate being output from a light output surface of the lightguide plate, wherein the frame includes: a first frame portion of which at least one side constitutes an inner peripheral surface of the frame, the first frame portion being made of a light-reflecting material (for example, white resin); and a second frame portion with which an outer peripheral surface of the first frame portion is covered, the second frame portion being made of a light-absorbing material (for example, black resin).

In the surface light source device according to one or more embodiments of the invention, the inner peripheral surface of at least one side of the frame includes the first frame portion made of the light-reflecting material such as the white resin, so that the light that leaks from the outer peripheral surface of the lightguide plate can be reflected and incident to the lightguide plate again by the first frame portion in the side. Therefore, the use efficiency of the light of the surface light source device can be improved to enhance the emission luminance. Additionally, in the surface light source device according to one or more embodiments of the invention, the outer peripheral surface of the first frame portion is covered with the second frame portion made of the light-absorbing material such as the black resin, so that the light transmitted through the first frame portion can be absorbed by the second frame portion to hardly leak to the outside of the frame. Therefore, the degradation of the visual quality, which is caused such that the light that leaks from the outer peripheral surface of the lightguide plate is transmitted through the frame to leak to the outside of the surface light source device, can be prevented when the surface light source device emits the light. Additionally, the malfunction caused by the light that is transmitted through the frame to leak out can be prevented in the photosensor or the light receiving portion, which is disposed near the surface light source device.

According to one or more embodiments of the invention, the first frame portion and the second frame portion are integrally molded. Because the first frame portion and the second frame portion are integrally molded, a process of assembling the first frame portion and the second frame portion is eliminated, and a risk of breaking down the frame is eliminated in the subsequent processes. Therefore, the surface light source device assembling work is simplified. On the other hand, in the case in which the first frame portion and the second frame portion are separately molded, it is necessary to assemble the first frame portion and the second frame portion, and there is a risk of breaking down the frame when the lightguide plate is accommodated in the frame after the frame is assembled.

According to one or more embodiments of the invention, in the surface light source device in which the first frame portion and the second frame portion are integrally molded, a bonded surface in which the outer peripheral surface of the first frame portion and the inner peripheral surface of the second frame portion are in contact with each other is inclined with respect to a surface perpendicular to a lower surface of the frame. The area of the bonded surface in which the outer peripheral surface of the first frame portion and the inner peripheral surface of the second frame portion are in contact with each other is larger than that of the bonded surface perpendicular to the lower surface of the frame. Therefore, the bonding strength between the first frame portion and the second frame portion can be enhanced, and the first frame portion and the second frame portion are hardly peeled off even in the low-profile frame.

According to one or more embodiments of the invention, in the surface light source device in which the first frame portion and the second frame portion are integrally molded, a light shielding sheet is disposed above the light source and the lightguide plate to cover surroundings of the light source and the lightguide plate therewith, and the light shielding sheet is bonded to upper surfaces of the first frame portion and the second frame portion while striding over the bonded surface in which the outer peripheral surface of the first frame portion and the inner peripheral surface of the second frame portion are in contact with each other. The first frame portion and the second frame portion are retained by the light shielding sheet bonded to the upper surfaces of the first frame portion and the second frame portion. Therefore, the bonding strength between the first frame portion and the second frame portion can be enhanced, and the first frame portion and the second frame portion are hardly peeled off even in the low-profile frame.

According to one or more embodiments of the invention, in the surface light source device in which the first frame portion and the second frame portion are integrally molded, at least part of the bonded surface in which the first frame portion and the second frame portion are in contact with each other is bent or curved along a length direction of a side in which the bonded surface is located. Because the bonded surface is bent or curved, the area of the bonded surface in which the outer peripheral surface of the first frame portion and the inner peripheral surface of the second frame portion are in contact with each other can be enlarged to enhance the bonding strength between the first frame portion and the second frame portion, and the first frame portion and the second frame portion are hardly peeled off even in the low-profile frame.

According to one or more embodiments of the invention, in the surface light source device in which the first frame portion and the second frame portion are integrally molded, in the bonded surface in which the first frame portion and the second frame portion are in contact with each other, a protrusion is formed in one of bonded surfaces of the first frame portion and the second frame portion, a dent is formed in the other bonded surface, and the protrusion is fitted in the dent. The first frame portion and the second frame portion, which are integrally molded, are hardly peeled off because the protrusion that is provided in one of the bonded surfaces of the first frame portion and the second frame portion is fitted in the dent that is provided in the other bonded surface. Therefore, even in the low-profile frame, the first frame portion and the second frame portion are hardly peeled off during the surface light source device assembling work, which allows the surface light source device producing process to be facilitated.

According to one or more embodiments of the invention, an entire periphery of the frame is formed by bonding the first frame portion and the second frame portion. Because the entire periphery of the frame is formed by the first frame portion and the second frame portion, the use efficiency of the light can maximally be enhanced in the surface light source device, and the amount of light that transmitted through the frame to leak out can minimally be decreased.

According to one or more embodiments of the invention, the frame is formed into a rectangular frame shape, all the sides of the frame except the side closest to the light source are formed by binding the first frame portion and the second frame portion. Although the composite structure of the first frame portion and the second frame portion is not formed in the side closest to the light source in the frame, the small amount of light leaks from the surface (light incident end face) located opposite the light source in the outer peripheral surface of the lightguide plate. Therefore, the use efficiency of the light can be enhanced in the surface light source device, and the amount of light that transmitted through the frame to leak out can be decreased.

According to one or more embodiments of the invention, the frame is formed by combining the first frame portion and the second frame portion, which are separately molded. The first frame portion and the second frame portion are separately molded, so that the cost of the molding machine or the molding die can be reduced.

According to one or more embodiments of the invention, the first frame portion and the second frame portion are separately assembled, and the adhesive tape is bonded to the lower surfaces of the first frame portion and the second frame portion. Therefore, the first frame portion and the second frame portion can integrally be retained, and the first frame portion and the second frame portion are hardly separated in the subsequent assembling processes. When an adhesive tape that bonds the reflecting sheet to the lower surface of the frame is used as the adhesive tape, the number of components can be decreased to prevent the cost increase.

According to one or more embodiments of the invention, a frame for a surface light source device, a light source and a lightguide plate being accommodated in the frame such that an outer peripheral surface of the lightguide plate is surrounded, the frame includes: a first frame portion of which at least one side constitutes an inner peripheral surface of the frame, the first frame portion being made of a light-reflecting material; and a second frame portion with which an outer peripheral surface of the first frame portion is covered, the second frame portion being made of a light-absorbing material.

In the frame according to one or more embodiments of the invention, the inner peripheral surface of at least one side of the frame includes the first frame portion made of the light-reflecting material such as the white resin, so that the light that leaks from the outer peripheral surface of the lightguide plate can be reflected and incident to the lightguide plate again by the first frame portion in the side when accommodated in the surface light source device. Therefore, the use efficiency of the light of the surface light source device can be improved to enhance the emission luminance. Additionally, in the frame according to one or more embodiments of the invention, the outer peripheral surface of the first frame portion is covered with the second frame portion made of the light-absorbing material such as the black resin, so that the light transmitted through the first frame portion can be absorbed by the second frame portion to hardly leak to the outside of the frame. Therefore, the degradation of the visual quality, which is caused such that the light that leaks from the outer peripheral surface of the lightguide plate is transmitted through the frame to leak to the outside of the surface light source device, can be prevented when the surface light source device emits the light. Additionally, the malfunction caused by the light that is transmitted through the frame to leak out can be prevented in the photosensor or the light receiving portion, which is disposed near the surface light source device.

According to one or more embodiments of the invention, the first frame portion and the second frame portion are integrally molded. According to one or more embodiments of the invention, because the first frame portion and the second frame portion are integrally molded, the process of assembling the first frame portion and the second frame portion is eliminated, and the risk of breaking down the frame is eliminated in the subsequent processes. Therefore, the surface light source device assembling work is simplified.

BRIEF DESCRIPTION OF THE DRAWINGS

FIG. 4A is an enlarged perspective view illustrating a Y portion (that is, part of a frame) of FIG. 3; FIG. 4B is a perspective view illustrating a state in which a Z portion of FIG. 4A is viewed from a different direction;

FIG. 5A is a plan view illustrating the surface light source device of the first embodiment; FIG. 5B is a plan view illustrating the surface light source device in a state in which a light shielding sheet and an optical sheet are removed;

FIG. 11A is a perspective view illustrating part of a frame used in a surface light source device according to a fourth embodiment of the invention; FIG. 11B is an exploded perspective view illustrating part of the frame; FIG. 11C is a plan view illustrating part of the frame;

DETAILED DESCRIPTION OF INVENTION

Hereinafter, embodiments of the present invention will be described with reference to the drawings. The invention is not limited to the following embodiments, and various changes can be made without departing from the scope of the invention. In embodiments of the invention, numerous specific details are set forth in order to provide a more thorough understanding of the invention. However, it will be apparent to one with ordinary skill in the art that the invention may be practiced without these specific details. In other instances, well-known features have not been described in detail to avoid obscuring the invention.

[First Embodiment]

Figure 1:
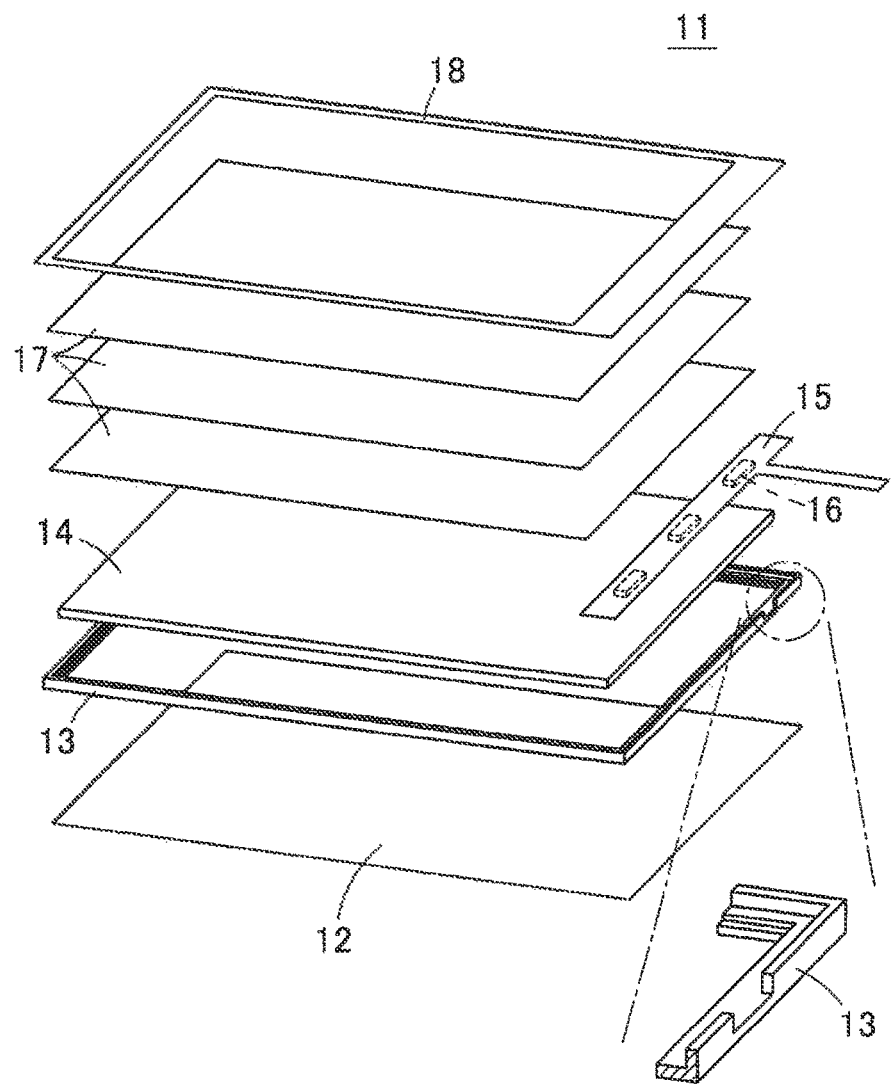
FIG. 1 is an exploded perspective view illustrating a structure of a conventional surface light source device.
Figure 2A:
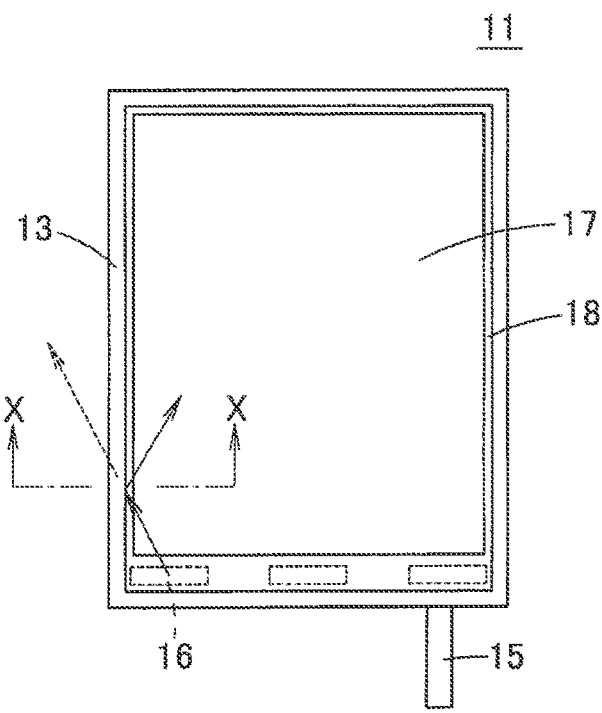
FIG. 2A is a plan view of the surface light source device of FIG. 1.
Figure 2B:
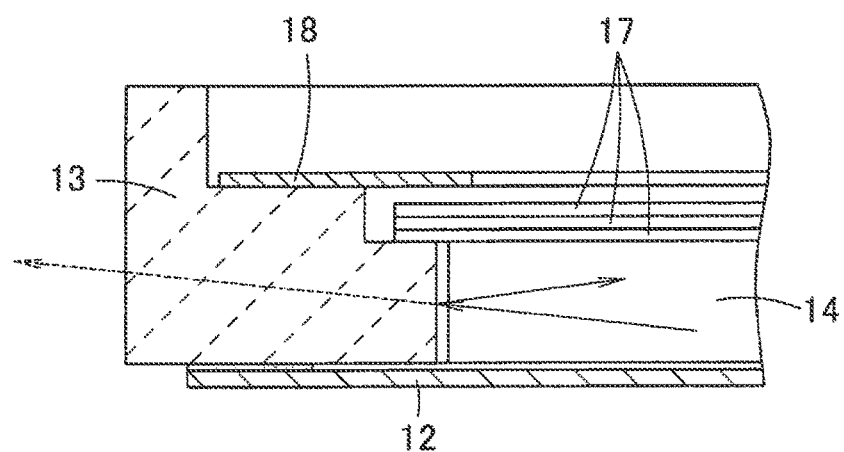
FIG. 2B is an enlarged sectional view taken on a line X-X of FIG. 2A.
Figure 3:
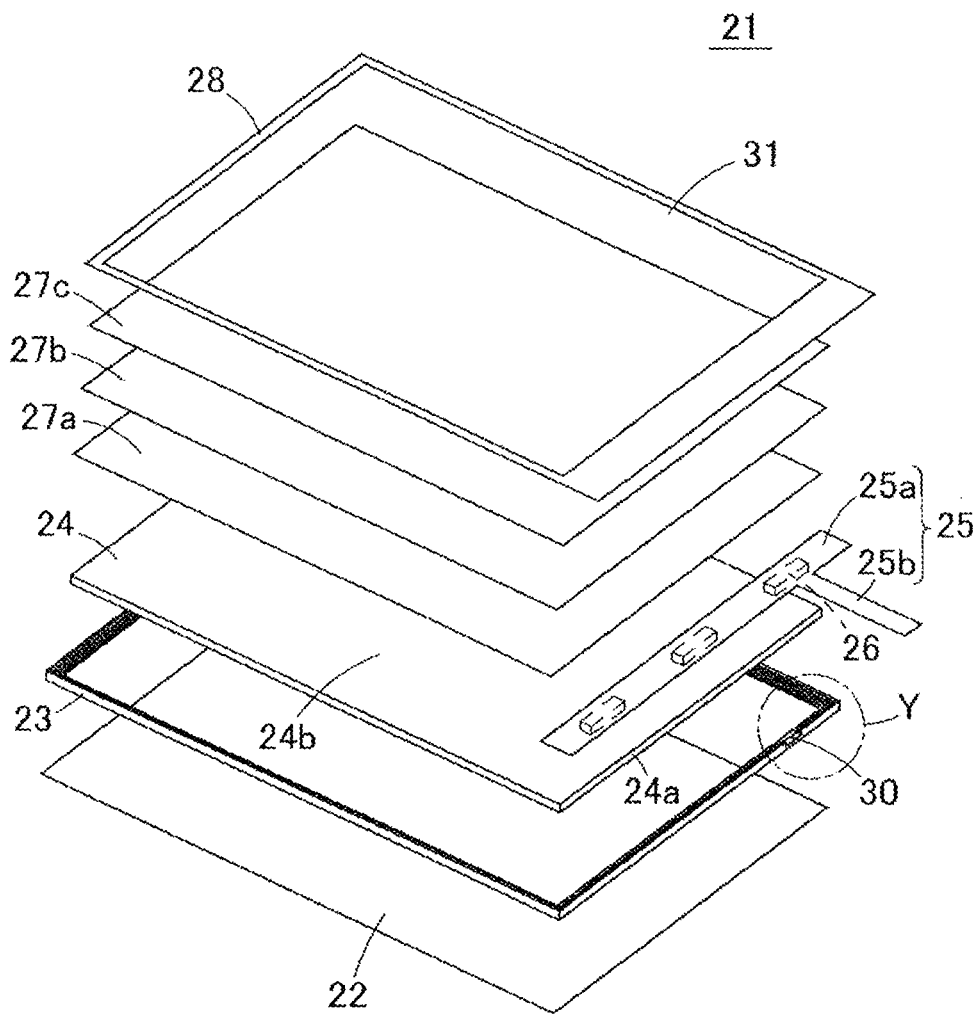
FIG. 3 is an exploded perspective view illustrating a surface light source device according to a first embodiment of the invention.

FIG. 3 is an exploded perspective view illustrating a surface light source device 21 according to a first embodiment of the invention. The surface light source device 21 includes a reflecting sheet 22, a frame 23, a lightguide plate 24, plural light sources 26 mounted on a lower surface of flexible printed board 25, a diffusion sheet 27a, prism sheets 27b and 27c (sometimes the diffusion sheet 27a and the prism sheets 27b and 27c are collectively referred to as an optical sheet), and a light shielding sheet 28.

The reflecting sheet 22 is a flat sheet made of a white resin sheet or a metallic foil, which has a high reflectance.

The flexible printed board 25 includes a light source mounting portion 25a on which the light source 26 is mounted and a lead portion 25b that connects the light source mounting portion 25a to an external circuit (power supply circuit). The lead portion 25b is drawn from the light source mounting portion 25a. The plural light sources 26 are mounted at constant intervals on the lower surface of the light source mounting portion 25a. The light source 26 is an LED white light source that emits white light. Usually a white-color light source in which an blue LED and a yellow fluorescent material are combined is used as the light source 26. Alternatively, a three-color LED white-color light source in which a red LED, a green LED, and the blue LED are combined may be used as the light source 26. In the light source 26, an LED chip is sealed in a transparent resin, and a whole surface except a front surface of the transparent resin is coated with a white resin, whereby the white light is emitted only from the transparent-resin front surface (emission window) that is not coated with the white resin.

The lightguide plate 24 is a plate having a substantially even thickness and molded by a translucent resin, such as polycarbonate and polymethylmethacrylate (PMMA), which has a high refractive index. The light source 26 is disposed with a micro gap between the emission window of the light source 26 and one end face (light incident end face 24a) of the lightguide plate 24, or the light source 26 is disposed while being in close contact with the light incident end face 24a of the lightguide plate 24. Many micro optical patterns 32 are formed in the lower surface (surface opposite a light output surface 24b) of the lightguide plate 24 (see FIG. 6).

When a cold-cathode tube is used as the light source, a lightguide plate having a wedge-shaped thickness may be used (see Japanese Unexamined Patent Publication No. 11-52140).

The diffusion sheet 27a is a semi-transparent resin film that expands a directional characteristic (angle of view) of illumination light by diffusing the light output from the upper surface (light output surface 24b) of the lightguide plate 24. The prism sheets 27b and 27c are a transparent resin film in which triangular prism-shaped fine patterns are formed in an upper surface, and directions of the patterns of the prism sheets 27b and 27c are orthogonal to each other when the prism sheets 27b and 27c are vertically viewed from above. The light shielding sheet 28 is a flexible black adhesive sheet (rim sheet) in which both surfaces constitute adhesive surfaces. The light shielding sheet 28 is formed into a frame shape, and has an opening 31 in a region (emission surface) corresponding to the effective emission region of the lightguide plate 24.

The frame 23 surrounds the lightguide plate 24 and the optical sheets 27a, 27b, and 27c, and acts as a casing of the surface light source device 21 along with the reflecting sheet 22 and the light shielding sheet 28.

FIGS. 4A and 4B are perspective view illustrating a structure of the frame 23, FIG. 4A illustrates a Y portion of FIG. 3 while magnifying the Y portion, and FIG. 4B illustrates a state in which a Z portion of FIG. 4A is viewed from a different direction. In the frame 23, an outside frame portion 23b (second frame portion) is molded into a frame shape while being integral with an outer peripheral surface of a frame-shaped inside frame portion 23a (first frame portion). The inside frame portion 23a is molded into a rectangular frame shape using a resin material having a high reflectance, namely, a white resin (titanium oxide fin powders may be added). The outside frame portion 23b is molded into a rectangular frame shape using a resin material having a high absorptance, namely, a black resin. Accordingly, in four sides of the frame 23, the frame 23 has a composite structure of the inside frame portion 23a made of the white resin and the outside frame portion 23b made of the black resin.

In the inside frame portion 23a, a step portion 41 in which an inner peripheral edge of an upper surface 42 is lowered by one step is formed in the three sides except the side on the side on which the light source is disposed. In the inside frame portion 23a, the upper surface of the side on the side on which the light source is disposed is flush with the step portion 41. In the outside frame portion 23b, rib 44 projects from four sides along an edge on an outer peripheral side of an upper surface 43. A height from the lower surface to the upper surface 43 of the outside frame portion 23b is equal to a height from the lower surface to the upper surface 42 of the inside frame portion 23a, and the upper surface 43 of the outside frame portion 23b is flush with the upper surface 42 of the inside frame portion 23a. In the outside frame portion 23b, a notch 30 through which the lead portion 25b of the flexible printed board 25 passes is provided in the side on the side on which the light source is disposed, and a bottom surface of the notch 30 is flush with the step portion 41 of the inside frame portion 23a.

Figure 8:
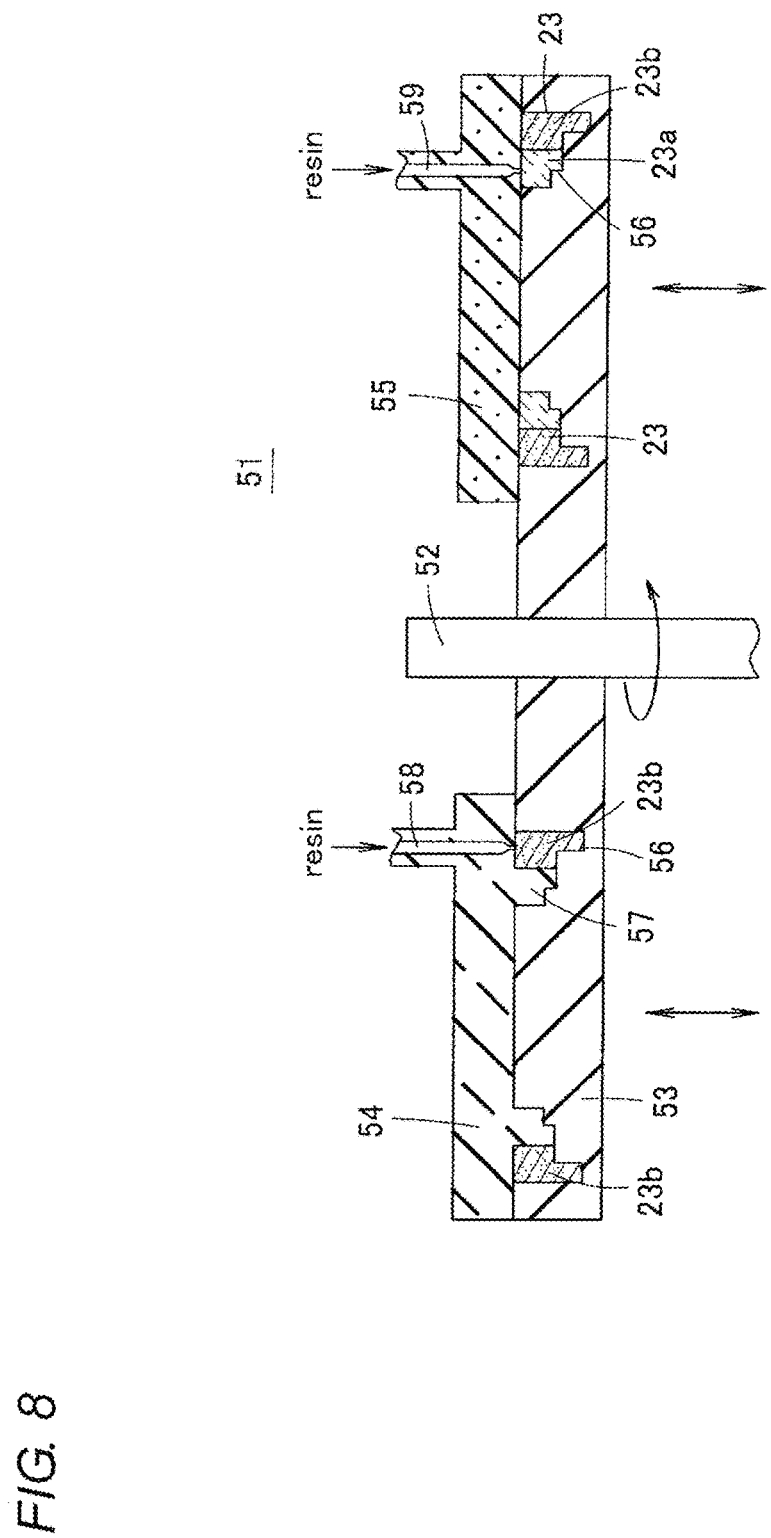
FIG. 8 is a conceptual view of a two-color molding machine that molds the frame.

The frame 23 is formed by integrally molding the inside frame portion 23a and the outside frame portion 23b using a two-color molding method. FIG. 8 is a conceptual view illustrating a structure of a two-color molding machine 51 that performs two-color molding of the frame 23. The two-color molding machine 51 can rotate about a rotating shaft 52, and includes a lower die 53 that can be elevated and lowered and two kinds of upper dies 54 and 55 that are disposed opposite the upper surface of the lower die 53. In the lower die 53, plural cavities 56 are formed to mold the frame 23, namely, the inside frame portion 23a and the outside frame portion 23b. On the other hand, the upper die 54 includes a die portion 57 that fills a space for molding the inside frame portion 23a in the cavities 56 of the lower die 53. The upper die 54 includes a sprue runner 58 through which the black resin is injected to a space (a molding space that is not filled with the die portion 57 in the cavities 56) for molding the outside frame portion 23b. The upper die 55 includes a sprue runner 59 through which the white resin is injected to a space for molding the inside frame portion 23a in the cavities 56.

The frame 23 is molded with the two-color molding 51 machine as follows: When the upper die 54 is lowered to close the cavities 56 of the lower die 53, the molding space of the inside frame portion 23a is closed by the die portion 57 at the molding position on the left of FIG. 8. When the black resin in a fluidized state is injected into the cavities 56 through the sprue runner 58, injection molding of the outside frame portion 23b is performed using the black resin. When the lower die 53 is lowered to open the die, the outside frame portions 23b are molded in the cavities 56, and the space for molding the inside frame portion 23a is formed inside the outside frame portion 23b.

Then the lower die 53 rotates to move the cavities 56 in which the outside frame portions 26 are retained to the molding positions on the right of FIG. 8. The lower die 53 is elevated to close the cavities 56, and the white resin in the fluidized state is injected into the cavities 56 through the sprue runner 59, whereby the inside frame portion 23a is molded by the white resin while being integral with the outside frame portion 23b. At the same time, the outside frame portion 23b is molded at the opposite position by the upper die 54.

The lower die 53 is lowered to open the die, and the inside frame portion 23a and the outside frame portion 23b become solid to integrally mold the frame 23. Then an eject pin (not illustrated) projects from the lower die 53 to take out the frame 23 from the cavities 56. The empty cavities 56 are returned to original positions by rotating the lower die 53.

The two-color molding machine 51 of FIG. 8 has the structure in which the inside frame portion 23a is molded after the outside frame portion 23b is molded. Alternatively, the outside frame portion 23b may be molded after the inside frame portion 23a is molded.

Figure 6:
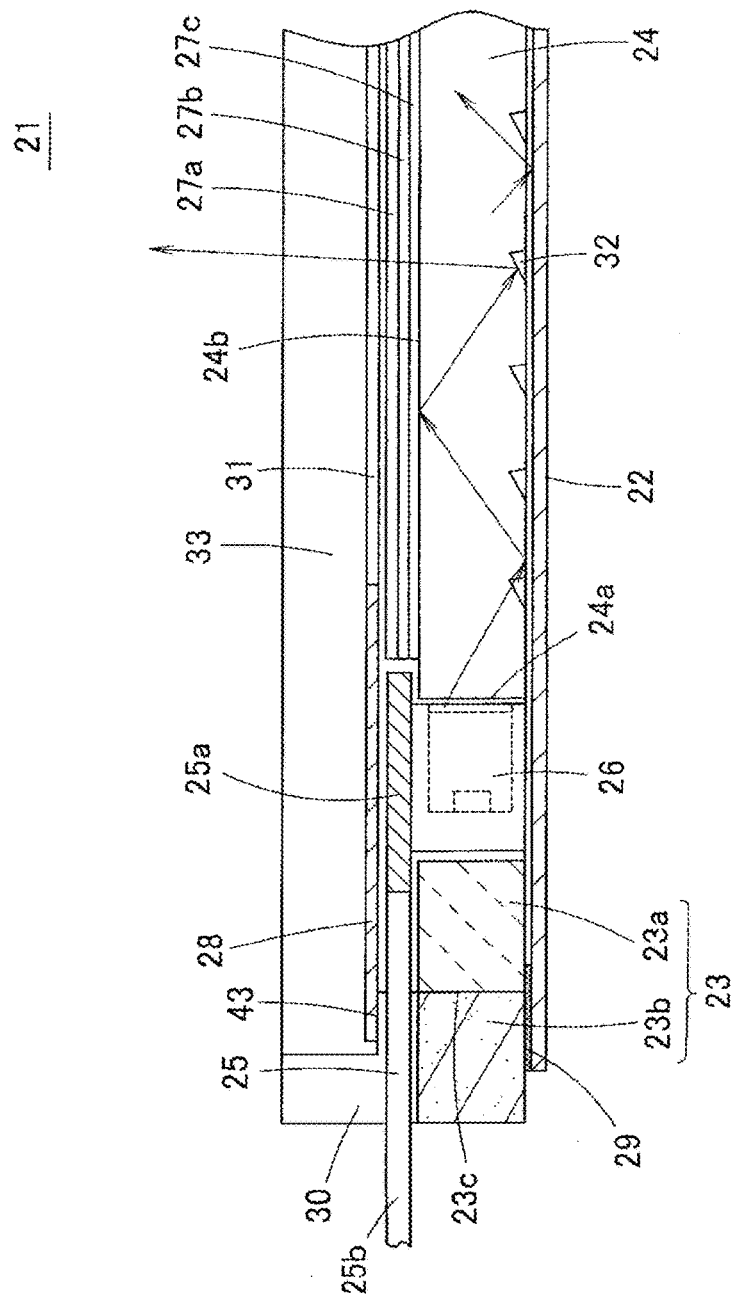
FIG. 6 is an enlarged sectional view taken on a line V-V of FIG. 5A.

A structure in assembling the surface light source device 21 will be described below with reference to FIGS. 5 to 7. FIG. 5A is a plan view of the assembled surface light source device 21, and FIG. 5B is a plan view of a state in which the light shielding sheet 28 and the optical sheets 27a, 27b, and 27c are removed. FIG. 6 is an enlarged sectional view taken on a line V-V of FIG. 5A, and FIG. 7 is an enlarged sectional view taken on a line W-W of FIG. 5A.

Figure 7:
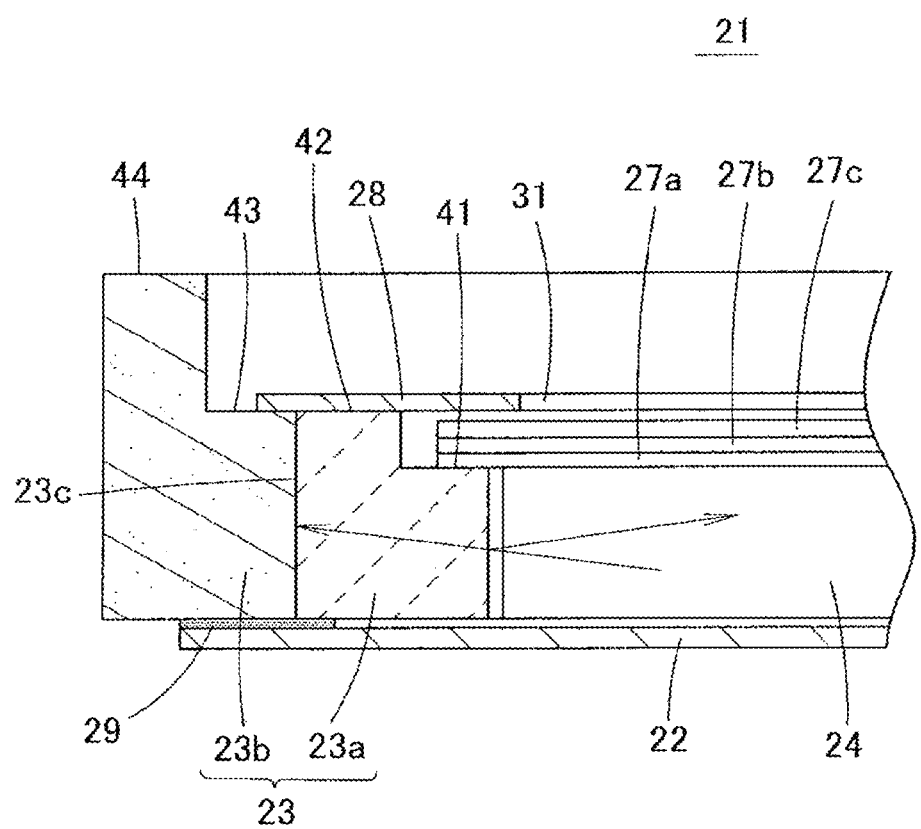
FIG. 7 is an enlarged sectional view taken on a line W-W of FIG. 5A.

As illustrated in FIGS. 6 and 7, an outer peripheral portion of the reflecting sheet 22 is bonded to the lower surface of the frame 23 with a double-sided adhesive tape 29, and the lower surface of the space in the frame 23 is closed by the reflecting sheet 22. The lightguide plate 24 is placed on the reflecting sheet 22 while accommodated in the frame 23. As illustrated in FIG. 6, the light source 26 is accommodated in the frame 23 while the emission window is disposed opposite the light incident end face 24a of the lightguide plate 24, and the lead portion 25b of the flexible printed board 25 is drawn to the outside of the frame 23 through the notch 30. FIG. 5B illustrates this state. The diffusion sheet 27a and the prism sheets 27b and 27c are overlapped on the light output surface 24b of the lightguide plate 24. The light shielding sheet 28 is overlapped on the prism sheet 27c, and the lower surface of the light shielding sheet 28 is bonded to the frame 23. The surroundings of the lightguide plate 24, the diffusion sheet 27a, and the prism sheets 27b and 27c are coated with the light shielding sheet 28, and the region corresponding to the effective emission region of the lightguide plate 24 is exposed from the opening 31.

As illustrated in FIG. 6, the light shielding sheet 28 is bonded to the upper surface 43 of the outside frame portion 23b in the side of the frame 23 on the side on which the light source is disposed. As illustrated in FIG. 7, the light shielding sheet 28 is bonded to the upper surface 43 of the outside frame portion 23b and the upper surface 42 of the inside frame portion 23a in the three sides of the frame 23 except the side on the side on which the light source is disposed.

Recently, because the thickness (width of section) of the frame 23 is decreased by thinning the surface light source device 21, an area of a bonded surface 23c (bonded surface in molding) of the inside frame portion 23a and the outside frame portion 23b is considerably reduced in the frame 23 for the low-profile surface light source device. Therefore, the bonded surface 23c of the frame 23 is possibly peeled off by an external load or the like. However, as illustrated in FIG. 7, the light shielding sheet 28 is bonded to the upper surface 42 of the inside frame portion 23a and the upper surface 43 of the outside frame portion 23b while striding over the bonded surface 23c, so that the inside frame portion 23a and the outside frame portion 23b are bonded by the light shielding sheet 28 to be able to enhance peel strength between the inside frame portion 23a and the outside frame portion 23b. Similarly, the double-sided adhesive tape 29 that bonds the reflecting sheet 22 is bonded to the lower surface of the inside frame portion 23a and the lower surface of the outside frame portion 23b while striding over the bonded surface 23c, so that the peel strength between the inside frame portion 23a and the outside frame portion 23b can further be enhanced.

The lightguide plate 24, the flexible printed board 25, the light source 26, the diffusion sheet 27a, and the prism sheets 27b and 27c, which are accommodated in the frame 23, are retained between the light shielding sheet 28 and the reflecting sheet 22 in the assembled surface light source device 21. In FIGS. 6 and 7, there is a gap between the lower surface of the light shielding sheet 28 and the prism sheet 27c or the flexible printed board 25. According to one or more embodiments of the invention, the lower surface of the light shielding sheet 28 is bonded to the edge of the prism sheet 27c or the flexible printed board 25 to fix the prism sheet 27c with the light shielding sheet 28.

When the light shielding sheet 28 is bonded to the frame 23, a space 33 (recess) surrounded by the rib 44 is formed on the light shielding sheet 28. A liquid crystal panel (not illustrated) is accommodated and retained in the space 33.

In the surface light source device 21 having the above-described structure, as illustrated by an arrow in FIG. 6, the light emitted from the light source 26 is incident to the lightguide plate 24 from the light incident end face 24a. The light incident to the lightguide plate 24 is guided in the lightguide plate 24 while totally reflected by the upper surface (light output surface 24b) and the lower surface of the lightguide plate 24, and the light spreads over the entire lightguide plate 24. Many prism-shaped micro optical patterns 32 (triangular-prism-shaped micro patterns in which the lower surface of the lightguide plate 24 is dented or triangular-prism-shaped micro patterns projected from the lower surface of the lightguide plate 24) are formed in the lower surface of the lightguide plate 24. Therefore, when the light guided in the lightguide plate 24 is incident to the optical pattern 32 and totally reflected by the optical pattern 32, the reflected light is output from the light output surface 24b of the lightguide plate 24. Because the light output from the light output surface 24b has a relatively narrow directional characteristic, the light is moderately diffused to widen the directional characteristic by transmitting the light through the diffusion sheet 27a. The travelling direction of the light is bent by transmitting the light through the prism sheets 27b and 27c such that the maximum luminance direction is brought close to the direction perpendicular to the light output surface 24b.

The light, which leaks from the lower surface of the lightguide plate 24, is reflected and incident to the lightguide plate 24 again by the reflecting sheet 22, whereby the reflecting sheet 22 functions to improve use efficiency of the light.

In the surface light source device 21 of the first embodiment, the light that is not output from the light output surface 24b but reaches the end face of both side surfaces of the lightguide plate 24 partially leaks from the end face of both side surfaces of the lightguide plate 24 as illustrated in FIG. 7, and the leaked light is reflected by an inner peripheral surface of the inside frame portion 23a made of the white resin and incident to the lightguide plate 24 again. Accordingly, the use efficiency of the light of the surface light source device 21 can be improved to enhance an emission luminance of the light output surface 24b. Additionally, the light that is not reflected by the inner peripheral surface of the inside frame portion 23a but transmitted through the inside frame portion 23a is absorbed by the outside frame portion 23b made of the black resin. Therefore, the light transmitted through the inside frame portion 23a hardly leaks to the outside of the frame 23, the edge of the surface light source device 21 is brightened to hardly degrade quality of the surface light source device 21, and a malfunction is hardly generated in a photosensor and a light receiving portion, which are disposed near the surface light source device 21. According to the surface light source device 21 of the first embodiment, even if the frame 23 is thinned, the use efficiency of the light can be improved to enhance the luminance of the emission surface, and the quality of the surface light source device 21 is improved because the light hardly leaks to the surroundings.

At this point, when the inside frame portion 23a is excessively thin, the light is hardly reflected by the inner peripheral surface of the inside frame portion 23a, thereby degrading the use efficiency of the light. When the outside frame portion 23b is excessively thin, the light is hardly absorbed by the outside frame portion 23, thereby increasing the leakage of the light. According to one or more embodiments of the invention, the thicknesses of the inside frame portion 23a and the outside frame portion 23b is maintained at a proper ratio (for example, 1:1) while the inside frame portion 23a and the outside frame portion 23b are not thinned too much. The ratio of the thicknesses depends on a material (reflectance) of the inside frame portion 23a and a material (absorptance) of the outside frame portion 23b, and the uses of the inside frame portion 23a having the high reflectance and the outside frame portion 23b having the high absorptance considerably widen an allowable range of the ratio of the thicknesses. Therefore, the thicknesses (the ratio of the thicknesses) of the inside frame portion 23a and the outside frame portion 23b may be fixed by experiments or simulations according to the materials, and the inside frame portion 23a may be thicker than the outside frame portion 23b or the outside frame portion 23b may be thicker than the inside frame portion 23a.

According to one or more embodiments of the invention, the resin that has the reflectance as high as possible is used as the inside frame portion 23a after cost is taken into account, and the resin that has the absorptance as high as possible is used as the outside frame portion 23b after the cost is taken into account. Particularly, according to one or more embodiments of the invention, the inside frame portion 23a made of the material that has the reflectance as high as possible and the outside frame portion 23b made of the material that has the absorptance as high as possible are used when the frame 23 is thinned.

In the frame 23 of the first embodiment, because the inside frame portion 23a and the outside frame portion 23b are integrally molded, there is no risk of separating the inside frame portion 23a and the outside frame portion 23b in a process of assembling the surface light source device 21. Therefore, an efficient process of assembling the surface light source device 21 is achieved.

A method for depositing a metallic evaporation film or a plating film on the inner peripheral surface of the frame made of the black resin is also conceivable as the method in which the frame prevents the leakage of the light while reflecting the light. However, the deposition method increases the cost to form the evaporation film or the plating film, and there is a risk of peeling off the evaporation film or the plating film. Therefore, the deposition method is unreliable and lacks quality. On the other hand, because the frame 23 of the first embodiment is made by the two-color molding method using the high-reflectance resin (inside frame portion 23a) and the high-absorptance resin (outside frame portion 23b), the cost can be reduced, and the reliability is enhanced because of no peel-off.

As illustrated in FIGS. 6 and 7, when the light shielding sheet 28 is bonded to the upper surface 43 of the outside frame portion 23b such that the inside frame portion 23a is covered with the light shielding sheet 28, the light incident to the inside frame portion 23a can be prevented from leaking from the upper surface of the inside frame portion 23a to become stray light.

[Second Embodiment]

Figure 9:
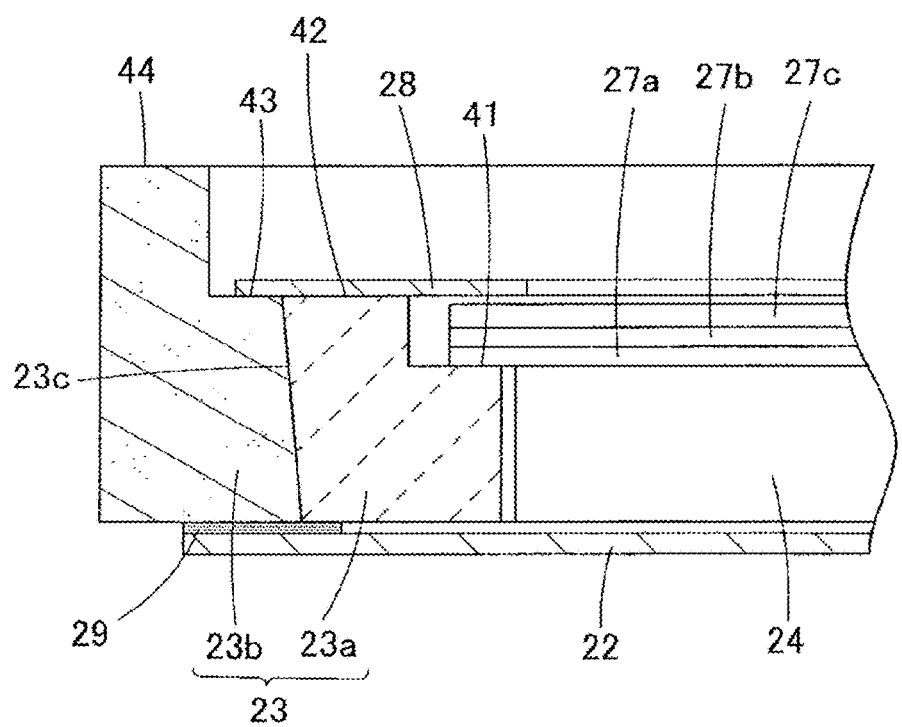
FIG. 9 is an enlarged sectional view illustrating part of a surface light source device according to a second embodiment of the invention.

FIG. 9 is an enlarged sectional view illustrating part of a surface light source device 81 according to a second embodiment of the invention. In the surface light source device 21 of the first embodiment, the bonded surface 23c between the inside frame portion 23a and the outside frame portion 23b is perpendicular to the lower surface of the frame 23. On the other hand, in the surface light source device 81 of the second embodiment, the bonded surface 23cII between the inside frame portion 23aII and the outside frame portion 23bII is inclined with respect to the surface perpendicular to the lower surface of the frame 23II. In FIG. 9, the bonded surface 23cII is inclined such that the inside frame portion 23IIa is thickened upward or such that the outside frame portion 23bII is thinned upward. Alternatively, the bonded surface 23cII may be inclined such that the inside frame portion 23aII is thinned upward or such that the outside frame portion 23bII is thickened upward. According to one or more embodiments of the invention, the bonded surface 23cII is inclined in all the four sides of the frame 23II. Alternatively, the bonded surface 23cII may be inclined in some sides of the frame 23II.

Because the area of the bonded surface 23II is not enlarged too much when the frame 23II is low, the inside frame portion 23aII and the outside frame portion 23bII are easily peeled off. However, even if the frame 23II is low, the area of the bonded surface 23cII can be enlarged when the bonded surface 23cII is inclined. Accordingly, bonding strength between the inside frame portion 23aII and the outside frame portion 23bII is increased, and the inside frame portion 23aII and the outside frame portion 23bII are hardly peeled off even if the external load is applied. When the bonded surface 23cII is inclined as illustrated in FIG. 9, a weight of the inside frame portion 23aII on which the optical sheets 27a, 27b, and 27c are placed can be received by the bonded surface 23cII, and the inside frame portion 23aII and the outside frame portion 23bII are more hardly peeled off.

In the second embodiment, the light shielding sheet 28 is bonded to the upper surface 42 of the inside frame portion 23aII and the upper surface 43 of the outside frame portion 23b while striding over the bonded surface 23c.

[Third Embodiment]

Figure 10A:
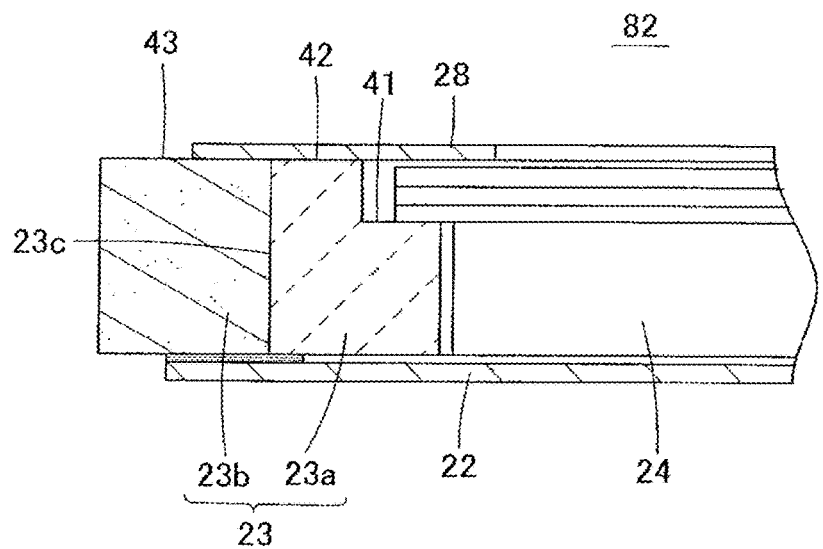
FIG. 10A is an enlarged sectional view illustrating part of a surface light source device according to a third embodiment of the invention.

FIG. 10A is an enlarged sectional view illustrating part of a surface light source device 82 according to a third embodiment of the invention. In the third embodiment, the rib 44 of the outside frame portion 23bIII is eliminated to flatten the upper surface 43 of the outside frame portion 23bIII. According to the third embodiment, the surface light source device 82 expands in application because a size of the liquid crystal panel is not restricted by the rib 44.

Figure 10B:
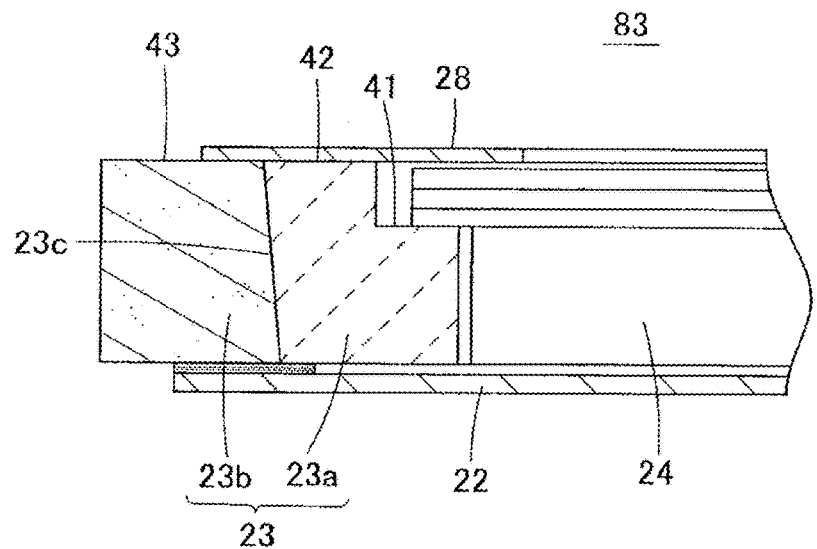
FIG. 10B is a sectional view illustrating a modification of the surface light source device of the third embodiment.

As illustrated in the surface light source device 83 of FIG. 10B, the rib 44 of the outside frame portion 23bIII may be eliminated in the frame 23III having the inclined bonded surface 23cIII.

[Fourth Embodiment]

FIG. 11A is a perspective view illustrating part of the frame 23IV used in a surface light source device according to a fourth embodiment of the invention. FIG. 11B is an exploded perspective view illustrating part of the frame 23IV. FIG. 11C is a plan view illustrating part of the frame 23IV.

In the third embodiment, the bonded surface 23cIII between the inside frame portion 23aIII and the outside frame portion 23bIII is bent or curved so as not to become straight when vertically viewed from above in part of the integrally-molded frame 23III, for example, in both side portions of the frame-shaped frame 23III. Referring to FIG. 11, in the bonded surface 23cIV, a rectangular projection 61 is formed in the inside frame portion 23aIV, and a recess 62 that engages the projection 61 is formed in the outside frame portion 23bIV. Alternatively, in the bonded surface 23cIV, the rectangular recess may be formed in the inside frame portion 23aIV while the projection is formed in the outside frame portion 23bIV. The projection and the recess can be formed in any shape such as V-shape (triangular shape) and a round shape (arc shape).

When the whole or part of the bonded surface 23cIV is formed into a zigzag shape, because the area of the bonded surface 23cIV is increased, the bonding strength between the inside frame portion 23aIV and the outside frame portion 23bIV is increased to hardly generate the peel-off. In the fourth embodiment, the horizontal section of the bonded surface 23cIV has the same shape from the upper surface to the lower surface of the frame 23IV, so that a die structure of the two-color molding machine that molds the frame 23IV can be simplified.

[Fifth Embodiment]

Figure 12A:
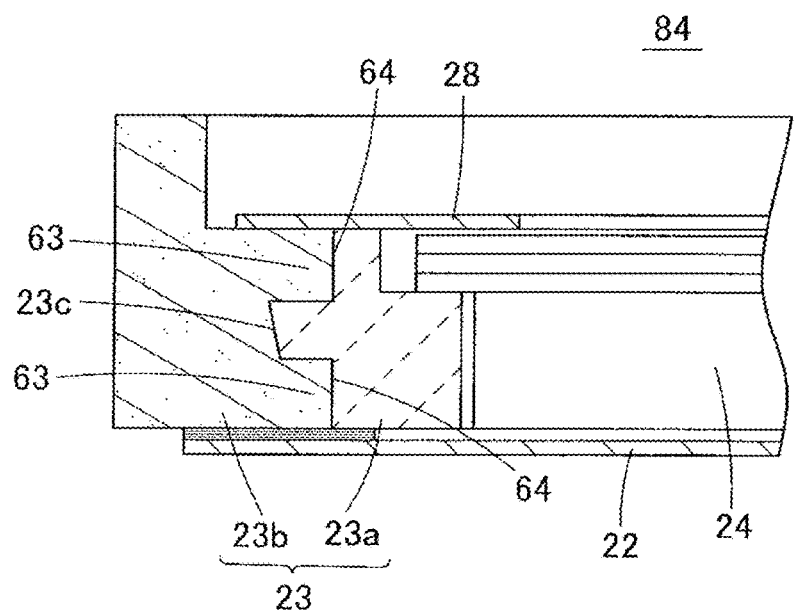
FIGS. 12A and 12B are partially sectional views illustrating a surface light source device according to a fifth embodiment of the invention.
Figure 12B:
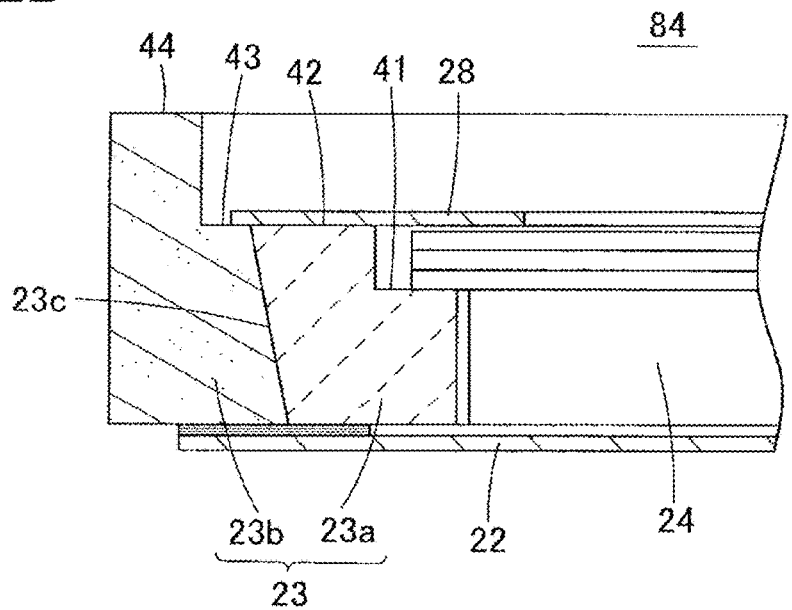
Figure 13:
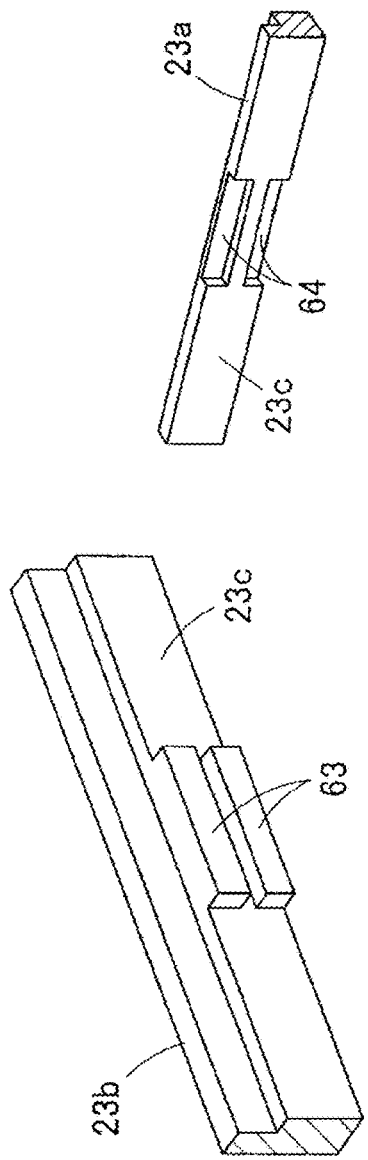
FIG. 13 is an exploded perspective view illustrating part of a frame used in the surface light source device of the fifth embodiment.

FIGS. 12A and 12B are sectional views illustrating different positions of a surface light source device 84 according to a fifth embodiment of the invention. FIG. 13 is an exploded perspective view illustrating part of the frame 23V used in the surface light source device 84.

The bonded surface 23cV is flat in the most frame 23V used in the surface light source device 84 as illustrated in FIG. 12B, a protrusion 63 and a dent 64 are formed in part of the bonded surface 23cV as illustrated in FIGS. 12A and 13. That is, as illustrated in FIG. 13, the pair of protrusions 63 is formed in the bonded surface 23cV of the outside frame portion 23bV, the pair of dents 64 is formed in the bonded surface 23cV of the inside frame portion 23aV, and the inside frame portion 23aV and the outside frame portion 23bV are integrally molded such that each protrusion 63 is fitted in each dent 64.

In the surface light source device 84 of the fifth embodiment, because the protrusion 63 of the outside frame portion 23bV is fitted in the dent 64 of the inside frame portion 23aV, the inside frame portion 23aV and the outside frame portion 23bV are not separated unless the frame 23V is broken, and the surface light source device assembling work is facilitated to improve durability of the frame 23V.

Figure 14A:
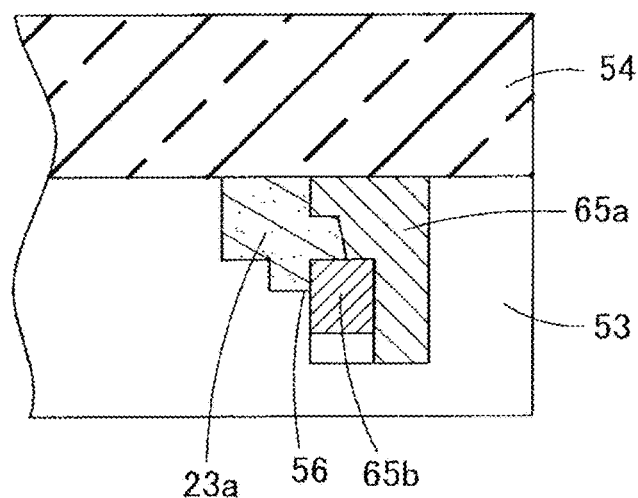
FIGS. 14A and 14B are views illustrating a method for molding the frame of the fifth embodiment.
Figure 14B:
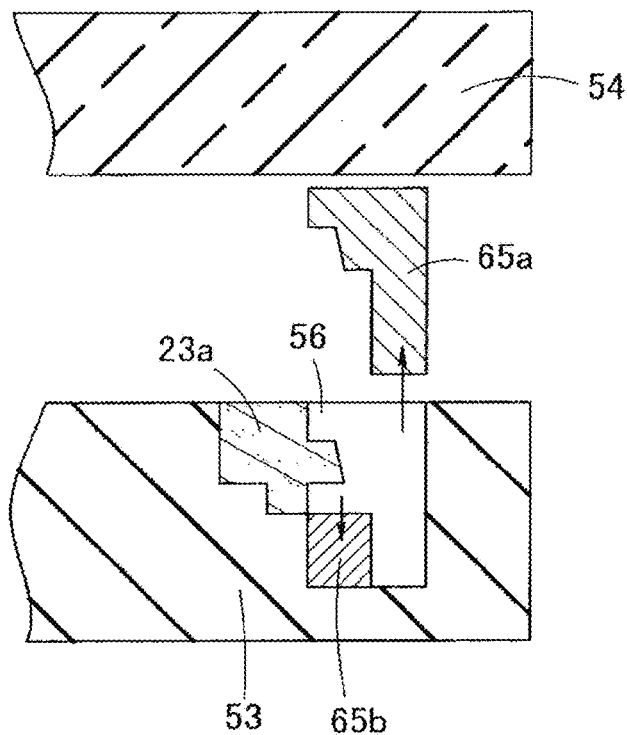

In integrally molding the frame 23V having the above-described structure with the two-color molding machine, for example, as illustrated in FIG. 14A, the die portion that fills the space for molding the outside frame portion 23bV is divided into two die portions 65a and 65b in the cavity 56 used to mold the frame 23V. After the inside frame portion 23bV is molded, the die portions 65a and 65b are vertically slid by a cam mechanism (not illustrated) as illustrated in FIG. 14B, which allows the space to be formed in order to mold the outside frame portion 23bV in the cavity 56. In the fifth embodiment, the structure of the two-color molding machine can further be simplified, when only the die portion 65b is moved by the cam mechanism while the die portion 65a and the lower surface of the upper die 54 are integrally formed. Alternatively, the die portion that fills the space for molding the inside frame portion 23aV or the outside frame portion 23bV may horizontally be slid by a slide mechanism.

Figure 15A:
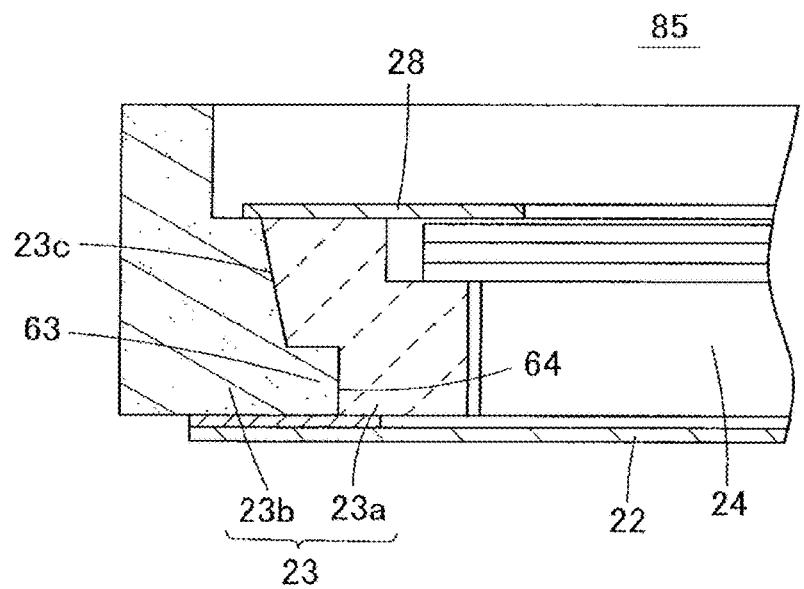
FIGS. 15A and 15B are partially sectional views illustrating a surface light source device according to a modification of the fifth embodiment.
Figure 15B:
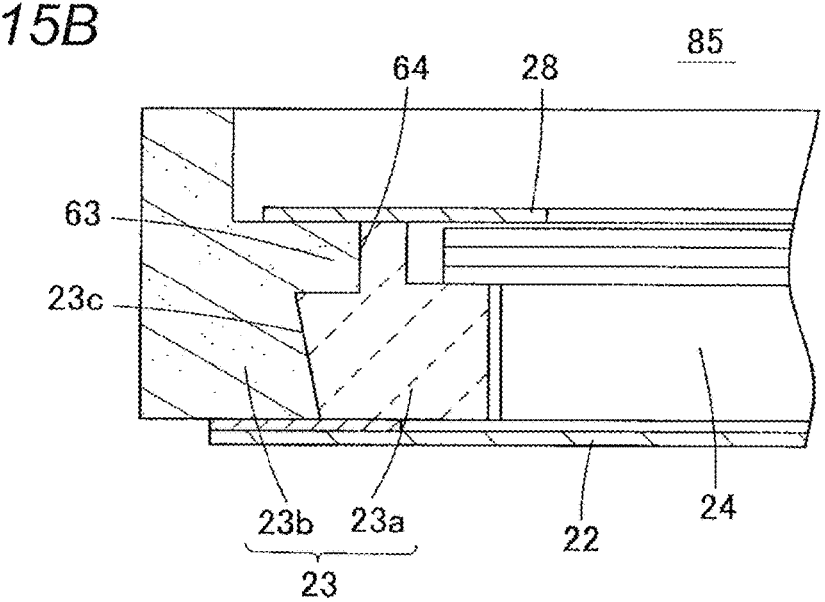
Figure 16:
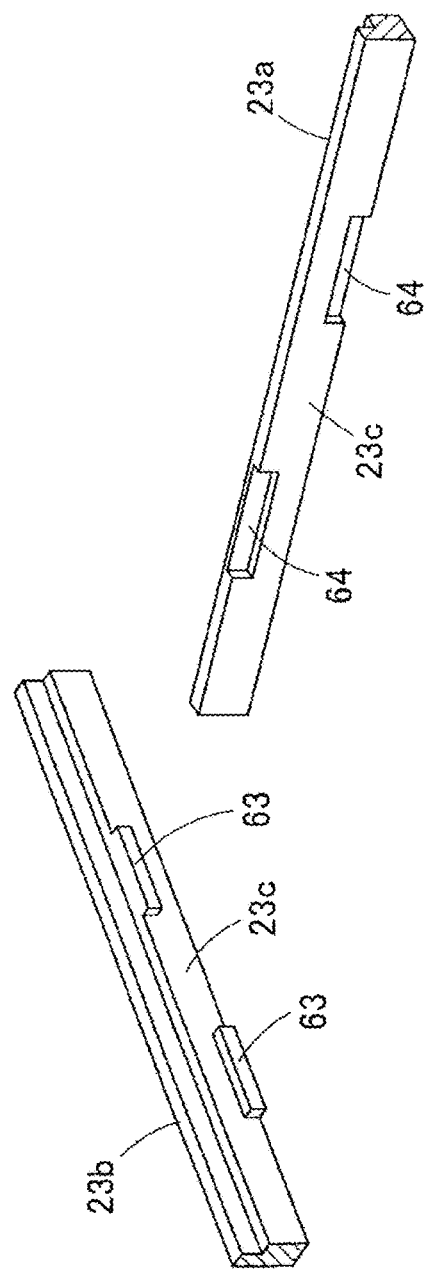
FIG. 16 is an exploded perspective view illustrating part of a frame used in the surface light source device of the modification of the fifth embodiment.

FIGS. 15A and 15B are sectional views illustrating different positions of a surface light source device 85 according to a modification of the fifth embodiment. In the modification, as illustrated in FIG. 16, the positions of the upper and lower protrusions 63 that are provided in the outside frame portion 23bV' are shifted in a length direction of the outside frame portion 23bV'. Similarly the positions of the upper and lower dents 64 that are provided in the inside frame portion 23aV' are shifted in the length direction of the inside frame portion 23aV'.

In FIG. 15, the protrusion 63 is provided in the outside frame portion 23bV' while the dent 64 is provided in the inside frame portion 23aV'. Alternatively, the dint 64 may be provided in the outside frame portion 23bV' while the protrusion 63 is provided in the inside frame portion 23aV'.

[Sixth Embodiment]

Figure 17:
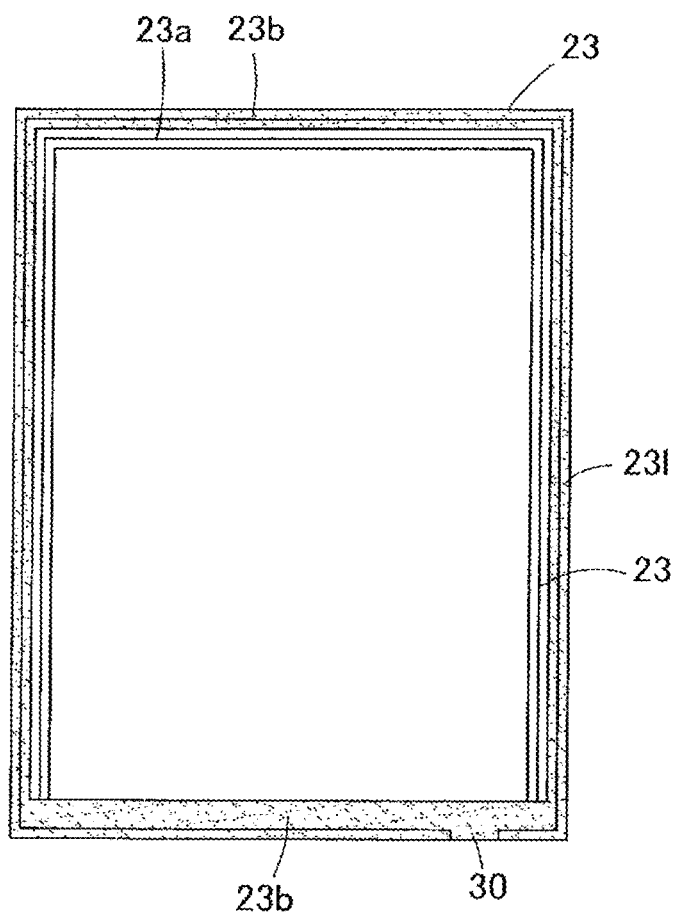
FIG. 17 is a plan view illustrating a frame used in a surface light source device according to a sixth embodiment of the invention.

FIG. 17 is a plan view illustrating the frame 23VI used in a surface light source device according to a sixth embodiment of the invention. In the frame 23VI of the sixth embodiment, the inside frame portion 23aVI made of the white resin is provided only in both the lateral sides and the side on the side farther away from the side on which the light source is disposed, and the side of the frame 23VI on the side on which the light source is disposed includes only the outside frame portion 23bVI made of the black resin. Accordingly, the composite structure of the inside frame portion 23aVI and the outside frame portion 23bVI are formed only in both the lateral sides and the side on the side farther away from the side on which the light source is disposed.

An experiment and a simulation, which are performed to evaluate the leakage of the light on the side on which the light source is disposed, will be described in order to explain the effect of the sixth embodiment. In the surface light source device having a frame in which the side on which the light source is disposed was made only of the black resin while the other three sides were made only of the white resin, when the luminance was measured at 25 points (the number of measuring points) in the emission surface, average luminance of 97% was obtained for the 25 points. In the surface light source device that has the same structure except that the four sides of the frame were made of the white resin, the average luminance was set to a reference (100%) when the luminance was measured at 25 points in the emission surface. In the surface light source device that has the same structure except that the four sides of the frame were made of the white resin, it was assumed that the average luminance was set to 100% when the luminance was measured at 289 points in the emission surface. In the surface light source device having the frame in which the side on which the light source is disposed was made only of the black resin while the other three sides were made only of the white resin, the average luminance of 97% was obtained when the luminance was measured at the 289 points. In the surface light source device that has the same structure except that the four sides of the frame were made of the white resin, it was assumed that the average luminance was set to 100% when the luminance was simulated at 25 points in the emission surface. In the surface light source device having the frame in which the side on which the light source is disposed was made only of the black resin while the other three sides were made only of the white resin, the average luminance of 99% was obtained when the luminance was simulated at the 25 points. Therefore, according to the experiment and simulation, it is found that an extremely small amount of light leaks from the surface (light incident end face 24a) that is located opposite the light source 26 in the outer peripheral surface of the lightguide plate 24.

Therefore, as illustrated in the frame 23VI of the sixth embodiment of FIG. 17, even if the inside frame portion 23aVI made of the white resin is eliminated on the side on which the light source is disposed, the light loss is small and the use efficiency of the light is hardly lowered.

On the other hand, sometimes the use efficiency of the light is hardly lowered even if the black resin is partially eliminated. Sometimes the use efficiency of the light is hardly lowered even if a small amount of light leaks because the photosensor and the light receiving portion are not disposed on the right of the surface light source device. In such cases, the right side of the frame may be made only of the white resin (the light that leaks from the right side of the frame has no influence on the use efficiency of the light of the surface light source device because the light is the transmitted light reflected by the white resin). The side on the light source side may be made only of the white resin.

[Seventh Embodiment]

Figure 18:
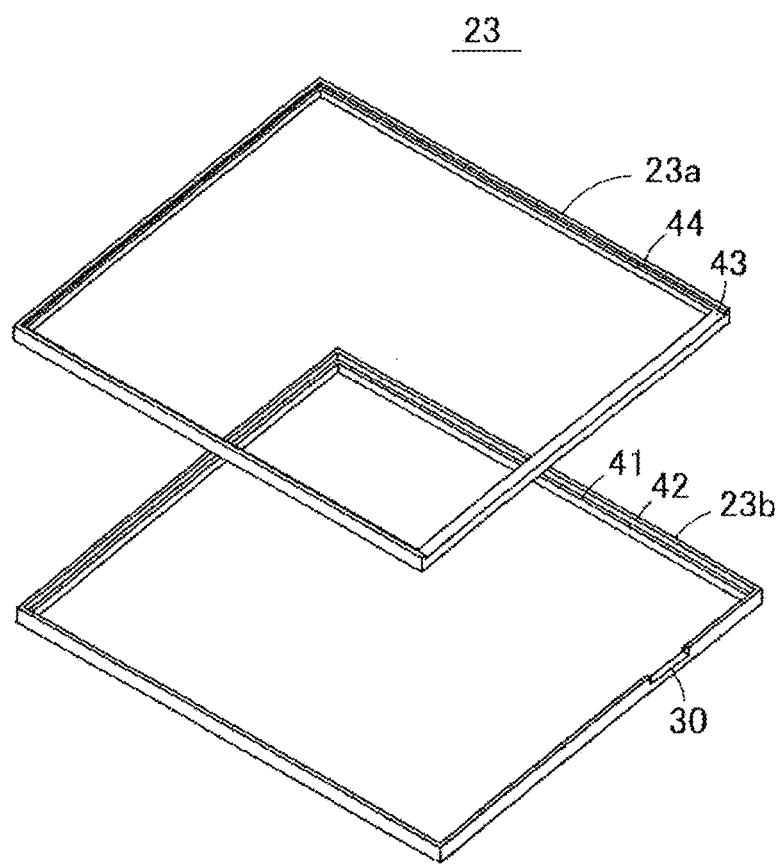
FIG. 18 is a perspective view illustrating a frame according to a seventh embodiment of the invention.

FIG. 18 is an exploded perspective view illustrating the frame 23VII used in a surface light source device according to a seventh embodiment of the invention. Although the frame 23VII includes the inside frame portion 23aVII made of the white resin and the outside frame portion 23bVII made of the black resin, the inside frame portion 23aVII and the outside frame portion 23bVII are not integrally molded but separately molded.

Figure 19A:
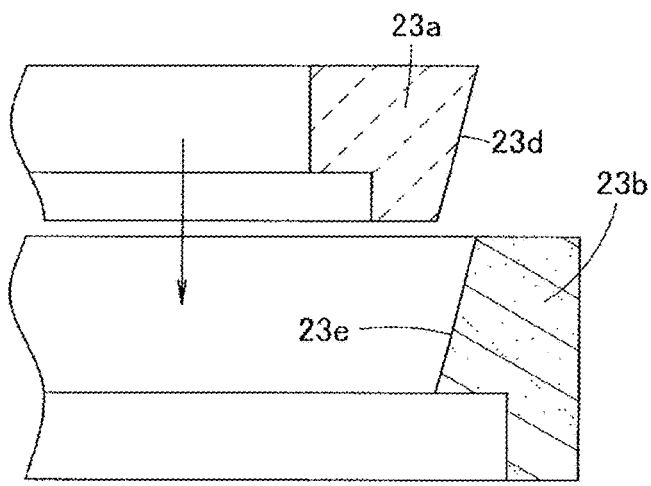
FIGS. 19A, 19B, and 19C are sectional views illustrating a state in which the surface light source device is assembled using the frame of the seventh embodiment.

When the inside frame portion 23aVII and the outside frame portion 23bVII are separately molded, it is difficult to fit the inside frame portion 23aVII and the outside frame portion 23bVII in each other, and there is a risk of separating the inside frame portion 23aVII and the outside frame portion 23bVII after accommodating the lightguide plate, thereby degrading the assembly productivity. Therefore, the inside frame portion 23aVII and the outside frame portion 23bVII are assembled as follows:

As illustrated in FIG. 19A, the outside frame portion 23bVII is placed while turning upside down, the inside frame portion 23aVII is accommodated in the outside frame portion 23bVII. At this point, an outer peripheral surface 23d of the inside frame portion 23aVII and an inner peripheral surface 23e of the outside frame portion 23bVII are tapered, the inside frame portion 23aVII is easily fitted in the outside frame portion 23bVII, and the inside frame portion 23aVII is retained in the outside frame portion 23bVII by the tapers.

Figure 19B:
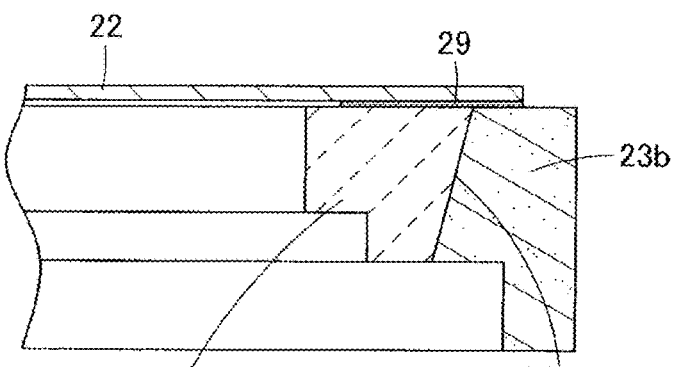
Figure 19C:
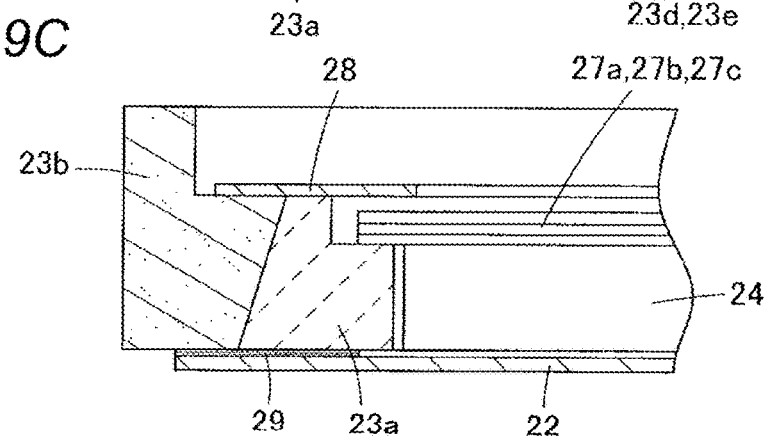

Then, as illustrated in FIG. 19B, in the entire periphery of the lower surface of the frame 23VII, the double-sided adhesive tape 29 is bonded to the lower surfaces of the inside frame portion 23aVII and the outside frame portion 23bVII, and the periphery of the reflecting sheet 22 is bonded to the lower surface of the frame 23VII by the double-sided adhesive tape 29. As a result, the inside frame portion 23aVII and the outside frame portion 23bVII are bonded by the double-sided adhesive tape 29, and the frame 23VII is integrally retained. It is conceivable that the outer peripheral surface 23d of the inside frame portion 23aVII and the inner peripheral surface 23e of the outside frame portion 23bVII are bonded by a bonding agent. In the method, it is difficult to apply the bonding agent, and it takes a time to cure the bonding agent. On the other hand, in the seventh embodiment, the inside frame portion 23aVII and the outside frame portion 23bVII can simply be integrated by the double-sided adhesive tape 29 in bonding the reflecting sheet 22.

Then, the frame 23VII is inverted and placed face up, the lightguide plate 24, the light source 26, and the optical sheets 27a, 27b, and 27c are accommodated in the frame 23VII, the light shielding sheet 28 is bonded to the upper surface 42 of the inside frame portion 23aVII and the upper surface 43 of the outside frame portion 23bVII, and the inside frame portion 23aVII and the outside frame portion 23bVII are further bonded by the light shielding sheet 28.

The projection 61 and the recess 62 illustrated in FIG. 11 or the protrusion 63 and the dent 64 illustrated in FIGS. 13 and 16 may be provided in the inside frame portion 23aVII and the outside frame portion 23bVII in order to increase the bonding strength between the inside frame portion 23aVII and the outside frame portion 23bVII.

The surface light source device used in the mobile phone is described in the embodiments. Additionally, for example, the surface light source device according to one or more embodiments of the invention can be used in liquid crystal display units of an electronic dictionary, a portable music player, and a tablet computer.

While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A frame for a surface light source device, wherein the frame is configured to accommodate a light source and a lightguide plate such that an outer peripheral surface of the lightguide plate is surrounded, the frame comprising:
   a first frame portion of which at least one side constitutes an inner peripheral surface of the frame, the first frame portion being made of a light-reflecting material; and
   a second frame portion with which an outer peripheral surface of the first frame portion is covered, the second frame portion being made of a light-absorbing material,
   wherein a bonded surface in which the outer peripheral surface of the first frame portion and an inner peripheral surface of the second frame portion are in contact with each other, is inclined with respect to the inner peripheral surface of the first frame portion.

2. The frame according to claim 1, wherein the first frame portion and the second frame portion are integrally molded.

3. A surface light source device comprising:
   a light source;
   a lightguide plate for guiding light emitted from the light source; and
   a frame that accommodates the lightguide plate and the light source such that an outer peripheral surface of the lightguide plate is surrounded by the frame,
   wherein light emitted from the light source is incident on the lightguide plate through an end face of the lightguide plate,
   wherein the light guided in the lightguide plate is output from a light output surface of the lightguide plate, and
   wherein the frame comprises:
   a first frame portion of which at least one side constitutes an inner peripheral surface of the frame, the first frame portion being made of a light-reflecting material; and
   a second frame portion with which an outer peripheral surface of the first frame portion is covered, the second frame portion being made of a light-absorbing material,
   wherein at least a part of a bonded surface, in which the outer peripheral surface of the first frame portion and an inner peripheral surface of the second frame portion are in contact with each other, is inclined with respect to the inner peripheral surface of the first frame portion.

4. The surface light source device according to claim 3, wherein, in a cross-section of the frame perpendicular to a direction in which the frame extends, the part of the bonded surface is inclined with respect to the inner peripheral surface of the first frame portion.

5. The surface light source device according to claim 3, wherein, in a cross-section of the frame perpendicular to a direction in which the frame extends, an entirety of the bonded surface is inclined with respect to the inner peripheral surface of the first frame portion.

6. The surface light source device according to claim 3, wherein, in a cross-section of the frame perpendicular to a direction in which the frame extends, a part of the frame, along a direction in which the frame extends, is inclined with respect to the inner peripheral surface of the first frame portion.

7. The surface light source device according to claim 3, wherein, in a cross-section of the frame perpendicular to a direction in which the frame extends, an entirety of the frame, along a direction in which the frame extends, is inclined with respect to the inner peripheral surface of the first frame portion.

8. The surface light source device according to claim 3, wherein the first frame portion and the second frame portion are integrally molded.

9. The surface light source device according to claim 3, wherein at least a part of a bonded surface in which the first frame portion and the second frame portion are in contact with each other is bent or curved along a length direction of a side in which the bonded surface is located.

10. The surface light source device according to claim 3, wherein, in the bonded surface in which the first frame portion and the second frame portion are in contact with each other:
    a protrusion is formed in one of the bonded surfaces of the first frame portion and the second frame portion,
    a dent is formed in the other bonded surface, and
    the protrusion is fitted in the dent.

11. The surface light source device according to claim 3, wherein the light-reflecting material is a white resin.

12. The surface light source device according to claim 3, wherein the light-absorbing material is a black resin.

13. The surface light source device according to claim 3, wherein an entire periphery of the frame is formed by bonding the first frame portion and the second frame portion.

14. The surface light source device according to claim 3,
    wherein the frame is formed into a rectangular frame shape, and
    wherein each side of the frame except a side closest to the light source are formed by binding the first frame portion and the second frame portion.

15. The surface light source device according to claim 3,
    wherein the first frame portion and the second frame portion are separately molded, and
    wherein the frame is formed by combining the first frame portion and the second frame portion.

16. The surface light source device according to claim 3, further comprising an adhesive sheet, wherein the adhesive sheet is bonded to lower surfaces of the first frame portion and the second frame portion while striding over the bonded surface in which the outer peripheral surface of the first frame portion and the inner peripheral surface of the second frame portion are in contact with each other, such that the first frame portion and the second frame portion are integrated with one another.

17. The surface light source device according to claim 16, wherein the adhesive sheet is one that bonds a reflecting sheet to the lower surfaces of the frame.

18. A liquid crystal display device comprising:
    a liquid crystal panel; and
    the surface light source device according to claim 3 disposed on a back of the liquid crystal panel.

19. A electronic device comprising a liquid crystal display device according to claim 18, and at least two light sources.

* * * * *